United States Patent [19]

Sell et al.

[11] 4,322,977

[45] Apr. 6, 1982

[54] PRESSURE MEASURING SYSTEM

[75] Inventors: Robert C. Sell; John R. Sheler, both of South Bend, Ind.; John M. Juhasz, Niles, Mich.

[73] Assignee: The Bendix Corporation, Southfield, Mich.

[21] Appl. No.: 153,129

[22] Filed: May 27, 1980

[51] Int. Cl.³ .............................................. G01L 9/12
[52] U.S. Cl. ....................................... 73/701; 73/708; 73/724; 324/60 C
[58] Field of Search ................. 73/701, 718, 724, 708, 73/304 C; 361/283, 284; 324/60 C

[56] References Cited

U.S. PATENT DOCUMENTS

| | | | |
|---|---|---|---|
| 3,237,178 | 2/1966 | Valentine | 73/304 C |
| 3,595,084 | 7/1971 | Bailey et al. | 73/718 |
| 3,750,476 | 8/1973 | Brown | 73/724 |
| 3,753,373 | 8/1973 | Brown | 73/724 |
| 3,858,097 | 12/1974 | Polye | 73/724 |
| 3,882,488 | 5/1975 | Kosakowski et al. | 340/347 CC |
| 4,001,813 | 1/1977 | Kosakowski | 340/347 R |
| 4,091,683 | 5/1978 | Delatorre | 73/718 |
| 4,133,205 | 1/1979 | Hulls et al. | 73/117.3 |
| 4,153,873 | 5/1979 | Grindheim | 361/283 |
| 4,165,650 | 8/1979 | Weissler | 73/700 |
| 4,214,479 | 7/1980 | Maier | 73/304 C |
| 4,289,035 | 9/1981 | Lee | 73/708 |

FOREIGN PATENT DOCUMENTS

WO 79/00194 4/1979 PCT Int'l Appl. .

OTHER PUBLICATIONS

Hewlett Packard Operating and Service Manual for an Automatic Capacitance Bridge, No. 4270A, pp. 4–1 to 4–2.

*Primary Examiner*—Donald O. Woodiel
*Attorney, Agent, or Firm*—William A. Marvin; Ken C. Decker

[57] ABSTRACT

A digital pressure measuring system with nonlinear resolution is disclosed. The system includes a capacitive pressure transducer with a pressure variable sensing capacitor and a substantially invariable reference capacitor. The capacitors of the transducer are excited by out-of-phase signals and their outputs combined at a summing junction. The output of the summing junction controls the incrementation of a counter whose output is converted to a nonlinear negative feedback signal. A closed loop is formed by applying the feedback signal to the summing junction through a feedback capacitor. The counter is incremented in a direction to null the loop such that its output is representative of the measured pressure.

30 Claims, 8 Drawing Figures

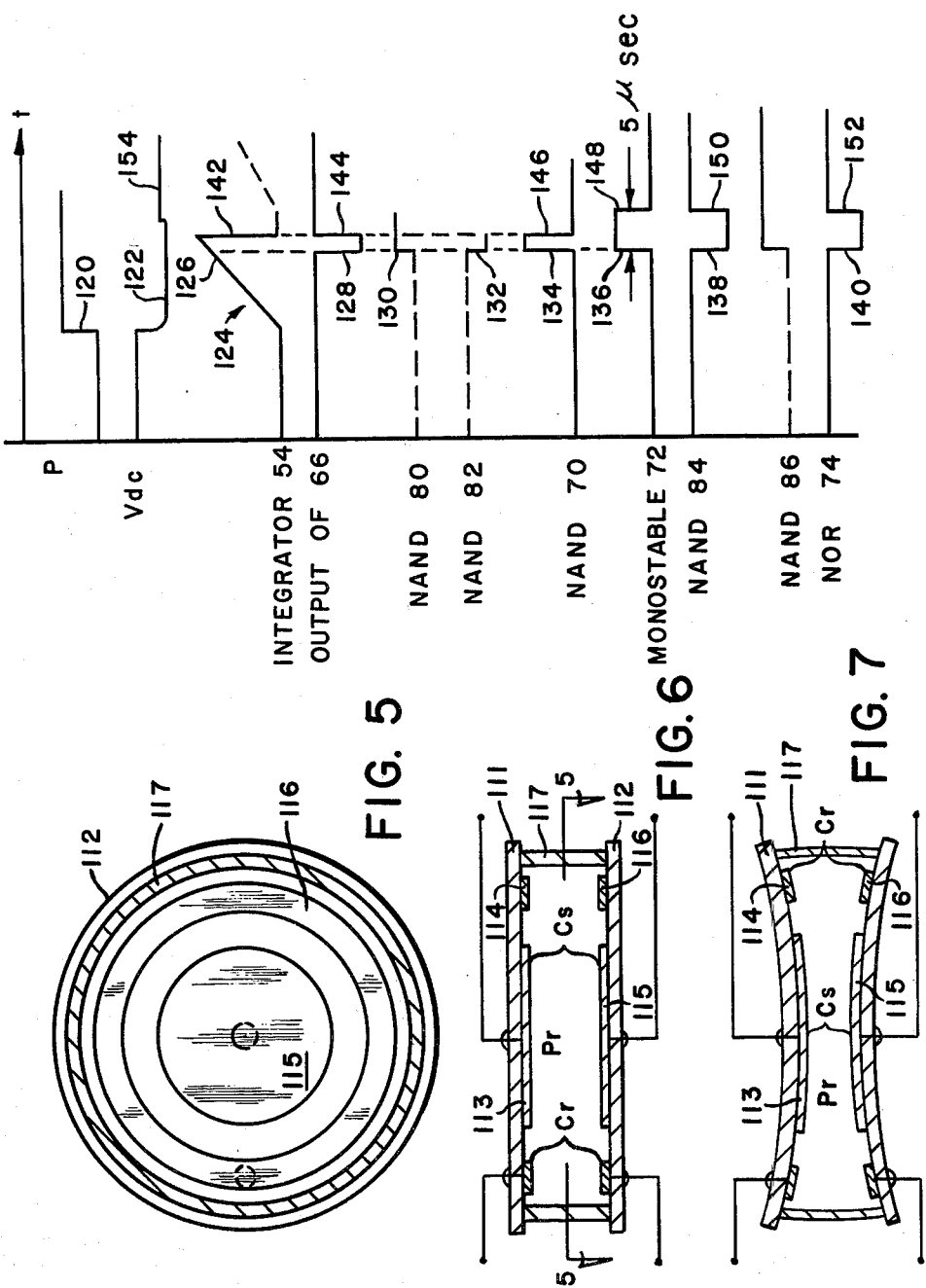

PRESSURE MEASURING SYSTEM

BACKGROUND OF THE INVENTION

The invention pertains generally to a pressure measuring system and is more particularly directed to a high resolution pressure measuring system including a dual configuration of quartz capacitive transducers.

In many areas of technology the necessity of measuring a pressure for a control system is becoming prevalent. Particularly, in the fuel control of combustion engines one of the most important parameters to be measured is the mass air flow ingested by the engine. To accurately describe the mass air flow, the change in density of the air corresponding to pressure changes in the air flow must be calculated. Modern pressure measuring systems are utilized to measure these changes.

Fuel control systems that advantageously include these pressure measuring systems are those conventionally found on gas turbine engines for aircraft or other uses. Normally, the ambient air pressure, compressor inlet pressure, and compressor output pressure are measured. The measured pressures are input to highly complex fuel and position schedules of an electronic controller for calculating the amount of fuel supplied to the engine and for the control of the variable geometry of the compressor. It is understood that the precision with which the controlled parameters are regulated by the electronic controller depends to a large extent on the accuracy of the pressure measurement.

Furthermore, for a more facile interfacing with an electronic fuel controller, a digital output is desirable. More often today fuel controllers are digital electronic processor oriented and a direct digital output from the pressure measuring system would allow the input of the information to a digital processor without further conversion or waste of program time. A direct digital output additionally eliminates the need for a separate time shared or dedicated analog to digital converter.

To precisely control gas turbine engines accuracies of 1% of point over a pressure range of 100-to-1 are desired. This requirement contemplates that for any pressure reading over the range the accuracy of the measurement will be maintained at a constant 1%. However, this operation produces a distinct resolution and measurement problem in the digital context. Because the smallest increment of a digital reading must correspond to 1% of the lowest pressure in the range, it will thus correspond to only 0.01% of the highest pressure. This amount of resolution at the highest pressure is equivalent to $\pm\frac{1}{2}$ parts out of 10,000 and thus would require digital components with at least a 15-bit capacity. Therefore, it would be highly desirable to provide a direct digital pressure measurement system with a 1% of point accuracy over a 100-to-1 range while using digital components with less than a 15-bit capacity.

A direct digital pressure measuring system that has been previously developed for providing 1% of point accuracy over a 100-to-1 pressure range is a closed loop feedback system comprising a pressure sensitive capacitor, a stable reference capacitor, and a stable feedback capacitor. The pressure sensitive capacitor and reference capacitor are excited by sinusoidal signals 180° out of phase with each other. The outputs of both capacitors are connected to a summing junction thereby producing a differential signal which is proportional to the pressure. The summing junction output is used to excite the feedback capacitor connected in a closed loop manner back to the input of the summing junction. The output from the feedback capacitor is utilized to null the differential signal and is thus a measure of the pressure. Additionally, the feedback loop includes a counter means for direct digital measurement of the number of discrete increments of feedback signal necessary to null the output of the summing junction. The digital readout of the counter is directly proportional to the desired pressure measurement.

This pressure measurement system, while providing the desired accuracy, is expensive because of the necessity of a 15-bit counter and digital-to-analog converter to measure the increments of feedback signal necessary to null the loop. Further, the slew rate of this system is too fast at the lower pressure measurements and too slow at the higher pressure measurements. Therefore, it would be desirable to reduce the number of bits necessary for the accuracy requirement while retaining the advantages of the direct digital readout of pressure.

SUMMARY OF THE INVENTION

The object of the invention is to provide an improved digital pressure measuring system of the closed loop type. The improved measuring system is accurate to 1% of point over a pressure range of 100-to-1 while having greatly reduced resolution requirements compared to conventional circuitry. Another advantage of the invention is the improvement of the slew rate of the pressure measuring system.

According to the invention, these advantages are obtained by nonlinearizing the feedback signal of a closed loop digital system according to a specified function. In the preferred embodiment the feedback signal is incremented at an increasing rate different than the rate of the incrementation of the digital count. Initially, at lower pressures the feedback signal increases at a slower rate with incrementation of the count but then increases to where the feedback signal incrementation rate is greater at higher pressures. This has the effect of compressing the digital count at the lower end of the pressure scale to maintain the 1% of point accuracy over the entire scale with fewer bits.

The invention is implemented in several preferred embodiments. In a first embodiment the nonlinear feedback signal is generated by a schedule of a multiplying digital-to-analog converter. For increasing counts of a digital counter the converter increases the feedback signal in increasingly larger increments to generate the nonlinear mode of operation.

In another preferred form the nonlinear function is generated by a function generator connected between the output of the digital-to-analog converter and the feedback capacitor. In this manner incremental changes in the feedback signal are produced by the function generator which are commensurate with the desired function.

In still another embodiment, a capacitive feedback transducer is connected between the output of the digital-to-analog converter and the summing junction. The feedback transducer replaces the feedback capacitor in the normal loop. The feedback transducer includes similarly to the sensing transducer, a pressure sensitive capacitance and a stable reference capacitance. The feedback transducer and sensing transducer are exposed to the same pressure changes so that both pressure sensitive capacitances changes proportionately. The described configuration provides the desired nonlinear function for the feedback signal because the output of the feedback transducer is proportional to the difference between the value of the feedback reference capacitor and the feedback pressure capacitor. This difference changes with pressure because of the variances in the pressure sensitive capacitor. At higher pressures the difference is larger and therefore increments in the digital count produce greater increases in the feedback signal. At lower pressures the difference is smaller and therefore, increments in the digital count produce smaller increases in the feedback signal.

Generating the nonlinear feedback signal by the differential signal from a capacitive transducer has a number of distinct advantages. Accuracy is of paramount importance in the pressure measuring system and is naturally dependent upon the accuracy of the smallest incremental change in the feedback signal. The difference between the feedback reference capacitor and the feedback pressure sensitive capacitor can be made very small with high degrees of accuracy and repeatability. The difference between these capacitances is thus an extremely desirable method by which nonlinearity can be introduced into the feedback loop.

Other objects, features, and aspects of the invention will be more clearly understood and better described if a reading of the detailed description is undertaken in conjunction with the appended drawings wherein:

BRIEF DESCRIPTION OF THE DRAWINGS

FIG. 5 is a cross-sectional top view of a quartz capacitive pressure transducer as utilized in the embodiments illustrated in FIGS. 1 and 4;

FIGS. 6 and 7 are all cross-sectional side views of the transducer illustrated in FIG. 5 in an unpressurized and pressurized state, respectively; and FIG. 8 is a graphical representation of detailed waveform diagrams taken at various points in the circuitry illustrated in FIG. 4.

DETAILED DESCRIPTION OF THE PREFERRED EMBODIMENTS OF THE INVENTION

Figure 1:
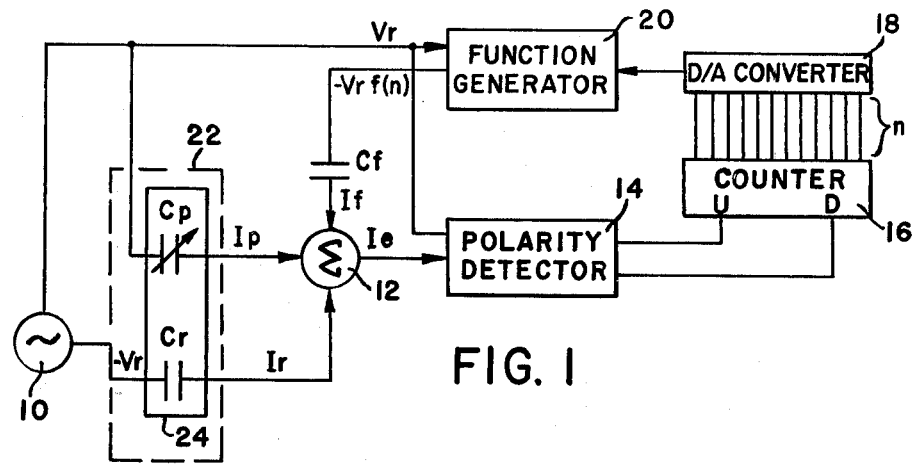
FIG. 1 is an electrical schematic view in block diagram form of a pressure measurement system constructed in accordance with the invention.

A direct digital pressure measuring system constructed in accordance with the teaching of invention will now be more fully described with reference to FIG. 1. The system includes a sinusoidal generator 10 which generates an excitation frequency that feeds a pressure sensitive capacitor $C_p$ and a relatively pressure insensitive reference capacitor $C_r$. These two primary capacitances are fed out of phase such that an excitation $V_r$ is fed to the pressure sensitive capacitor $C_p$ and an excitation $-V_r$, 180° out of phase with the former excitation, is fed to the reference capacitor $C_r$. Both primary capacitances are preferably contained in a single transducer capsule which will be more fully described hereinafter. The capsule is mounted in a pressure chamber 22 which communicates with the pressure to be measured.

The pressure sensitive capacitor $C_p$ therefore develops a current $I_p$ proportional to its capacitance and likewise the reference capacitor $C_r$ develops a current $I_r$ proportional to its capacitance. The current $I_r$ and $I_p$ are summed in a summing junction 12 to provide an error current $I_e$. The error current $I_e$ because of the 180° difference in excitation of the primary capacitances is equivalent to $I_p - I_r$. This difference can be expressed as a function of capacitance where $I_e = V_r (C_p - C_r)$.

It is readily evident that if $C_r$ and $C_p$ are equivalent at an initial reference pressure then the output of the summation junction 12 will be zero. When $C_p$ changes with variances in the pressure, however, an error current will be generated which is proportional to the change in $C_p$. $C_p$ may change either above or below the value of $C_r$ and thus the polarity and magnitude of the error current $I_e$ is proportional to the pressure to be measured in chamber 22. The conversion of the error current $I_e$ into a digital number is obtained by closing a loop around the summing junction 12 and calculating the amount of a feedback current $I_f$ that will be necessary to null the error current. The resolution is made by incrementally varying the feedback current $I_f$ and counting the number of increments.

The error current $I_e$ is input to a polarity detector 14 which, depending on the sense of the error current, indicates to a counter 16 to either count up or count down at a predetermined rate. The rate at which the counter operates can be constant or variable as will be more fully explained hereinafter. The output of the counter is converted by a digital-to-analog (D/A) converter 18 into an analog signal input to a function generator 20. The function generator 20 receives as another input the reference voltage $V_r$ and outputs a voltage $-V_r f(n)$ where $f(n)$ is a function based upon the number n resolved by the counter 16. This voltage is transmitted to a feedback capacitor $C_f$ to produce the feedback current $I_f$. The feedback current $I_f$ is of opposite polarity to the current $I_p$ and therefore, reduces the error current $I_e$ to zero as the counter is incremented. Thus, the polarity detector will continue to run the counter up or down until the error current is nulled by the feedback current $I_f$ and a final number is determined. At this point the digital number n output from the counter will be proportional to the pressure being sensed by the pressure sensitive capacitance $C_p$ thereby providing a direct digital readout of the measured parameter.

For every increment or count of the counter 16 the feedback current $I_f$ is also incremented according to the function $f(n)$, and the smallest increment of the feedback current determines the resolution of the system. The resolution is therefore based on two parameters, the number of bits (increments) available in counter 16 and the value of the feedback capacitor $C_f$ (size of the increment). Resolution or accuracy can be increased by making $C_f$ smaller but at the expense of the range over which the pressure is measurable. The pressure range over which the system is operational is limited by the number of bits in the counter 16 and thus when $C_f$ is made small enough to produce a 1% resolution over a 100-to-1 pressure range the counter will require 15 bits. This makes the D/A converter 18 extremely expensive and cumbersome. Further, for large pressure changes, this detrimentally affects the slew rate of the device as many small increments of feedback current have to be counted before a large pressure change can be nulled. On the other hand for the small pressure changes at the lower end of the pressure range the counter is incremented so quickly that the loop has a tendency to overshoot and hunt.

Therefore, according to the invention the function f(n) is non-linearized with respect to the digital count n. A preferred functional representation of the preferred relationship is shown graphically in FIG. 2. It is seen that as a function of the digital count versus pressure the increments of the feedback current are nonlinearized such that more increments of feedback current are necessary to count pressure at the low end of the pressure scale than at the high end. Upon reaching the high end of the scale the feedback increments are increased and therefore less counts are needed to step over larger increments of pressure. This operation is evident in the graphical representation where a change around 50% of full count will resolve a pressure change of X1 which is much smaller than the pressure change X2 resolved at 90% of full count for the same change in count.

This method of operation has several distinct advantages. The first is that there are more counts to resolve lower pressures and thus the accuracy of the device can be increased in this range while not sacrificing percent of point accuracy at the higher pressures. Further the resolution at higher pressures is lowered such that unnecessarily large amounts of counts are not needed to represent pressures in the upper range. According to one of the important objects of the invention this allows a counter with fewer bits to be used for the same accuracy and over the pressure range than if a linear function f(n) were used.

Another one of the advantages to the nonlinearizing of the feedback increments is that the slew rate is improved at both ends of the scale. Incrementation at the lower pressure ranges is slowed and the incrementation at the upper pressure range is increased. This slowing of the slew rate at the lower pressure ranges does away with overshoot and adds stability to the loop. The increase of the incrementation at the higher pressure ranges permits settling of the loop in a smaller absolute time for an increased response line.

Figure 3:
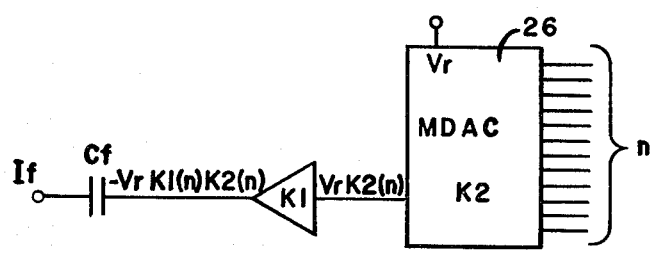
FIG. 3 is a detailed electrical schematic view of the feedback error loop of the pressure measurement system illustrated in FIG. 1.

With respect now to FIG. 3, there is illustrated one preferred form for generating the function $-V_r f(n)$. In this embodiment a multiplying digital analog converter 26, sometimes termed a ratiometric attenuator, is shown connected to an amplifier 28. The output of the amplifier is connected to the feedback capacitor $C_f$ and generates a voltage $-V_r K1(n) K2(n)$. This voltage delivered to the feedback capacitor $C_f$ to generate the feedback current $I_f$. The MDAC 26 receives as one input the digital number n from the counter 16 and the voltage $V_r$ from the generator 10. $V_r$ is then multiplied by a function K2(n) where K2(n) is the transfer function of the MDAC and is dependent upon the digital input n. This function is then inverted and multiplied by another function K1(n) where this function is the transfer function of the amplifier K1. It is apparent that either K1 or K2 or a combination of both can be used to generate the function f(n) so that the loop will operate in the desired manner.

Figure 2:
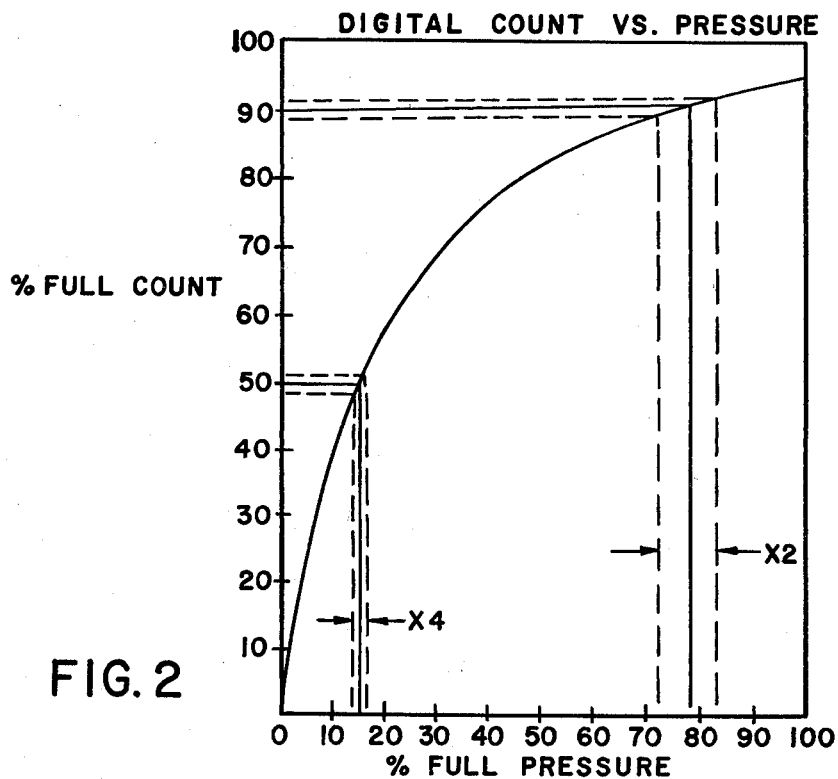
FIG. 2 is a graphical representation of the % digital output of the counter vs the % pressure scale for the system illustrated in FIG. 1.

This can be accomplished easily if the resistor ladder network of the MDAC 26 is trimmed to produce a function K2 such as that shown in FIG. 2. Further, the function K1, the transfer function of the amplifier 28, could be tailored to be substantially as is shown in FIG. 2. In either case a higher resolution at the lower pressure scale can be provided and a more advantageous slew rate.

In the previous preferred embodiments it has been taught how the function $-V_r f(n)$ can be changed nonlinearly by various components of the feedback loop to vary the feedback current in unequal increments to null the error voltage. These embodiments have been envisioned using a fixed feedback capacitance. In the next preferred embodiment shown in FIG. 4 it will now be described how the feedback capacitance $C_f$ may be changed to generate the same nonlinear function.

Figure 4:
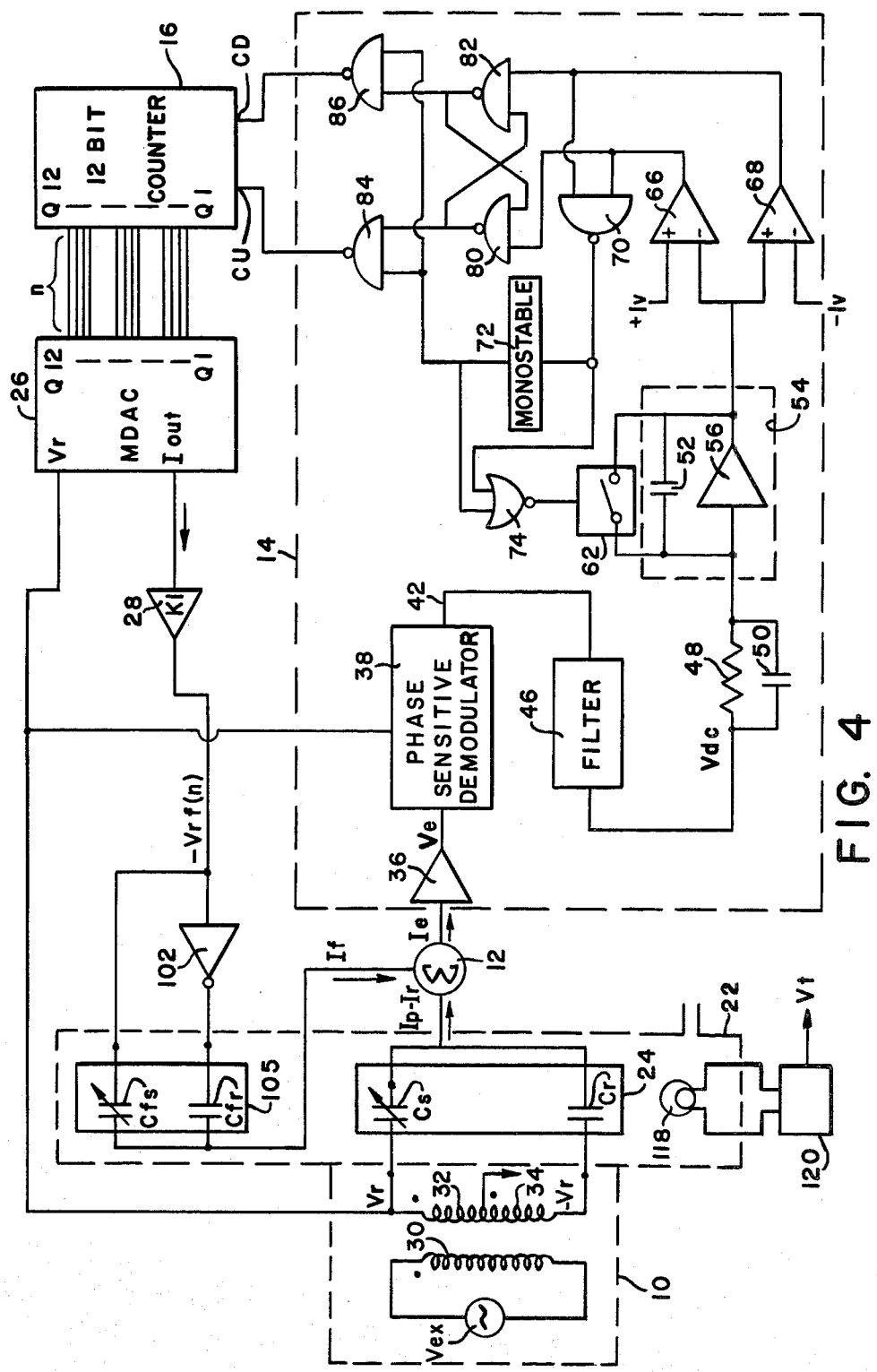
FIG. 4 is a detailed electrical schematic view of another embodiment of a pressure measurement system constructed in accordance with the invention.

In the manner of FIG. 1, the implementation of FIG. 4 illustrates a sinusoidal generator 10 feeding a pressure capsule 24 whose output is combined in the summing junction 12 to yield the error current $I_e$. The generator 10 is shown in detail to be implemented as a voltage source $V_{ex}$ which is connected across the primary winding 30 of a 1-to-1 transformer. The transformer includes a secondary winding which is grounded at a centertap to form a winding 32 of one polarity and a winding 34 of the opposite polarity. The nongrounded terminals of the windings 30 and 32 are connected to the input terminals of the capacitors $C_s$ and $C_r$, respectively. This configuration is provided to generate the two equivalent, but oppositely phased excitation voltages $V_r$ and $V_r$.

The feedback capacitance $C_f$ in this implementation is embodied as a transducer capsule 105 mounted in the same pressure chamber 22 as the transducer capsule 24. Also included in this expanded pressure chamber 22 is a temperature sensitive device 118 connected to a sensing circuit 120. The circuit 120 outputs a signal $V_t$ that is indicative of the temperature of the chamber 22. The temperature device can be a temperature transducer No. AD 590 manufactured by the Analog Devices Corp. The temperature signal $V_t$ may be utilized to correct the pressure representations, n, for variations in temperature of the chamber 22.

FIGS. 5, 6, and 7 illustrate the preferred implementation of quartz capacitive transducers which are schematically shown in FIGS. 1 and 4 as elements 24 and 105. The transducer comprises two opposing discs or plates 111, 112 of quartz or similar vitreous material with similar temperature and flexation characteristics. On the face of each disc, for example, disc 112, there is formed two capacitor plates 115 and 116 of some conductive material by a screening or vapor deposition process or the like. After formation of the plates 115 and 116 on disc 112 and similar plates 113 and 114 on disc 111, the discs are joined at their peripheral edge to form a gap between them by an annular frit 117. The frit 117 is of an insulating material and the interior of the transducer is evacuated or set at a reference pressure $P_r$.

As is seen in FIG. 7, a change in outside pressure P will cause a deformation of the discs 111, 112 and vary the gap distance between the quartz discs. This flexation varies the distance between capacitor plates 113 and 115 and thus varies the capacitance of the pressure variable capacitor $C_s$ formed of those plates. Normally, a reference capacitor $C_r$ formed of the plates 114 and 116 does not change capacitance appreciably and can be used for reference compensation. This operation results from the fact that the central portions of the discs are easily deflectable while the portions adjacent the edges are relatively nondeflectable. A capacitive pressure transducer of this type is more fully disclosed in a commonly assigned U.S. Pat. No. 3,858,097 issued to Polye, the disclosure of which is hereby expressly incorporated by reference.

The capacitive transducers 24 and 105 are advantageously formed in this manner and may be trimmed to accurate values. It is preferred that the output of each sensor be a substantially linear function of pressure and proportional to the difference of $C_s - C_r$.

The polarity detector 14 which controls the rate and direction of the counter 16 will now be more fully explained with respect to the detailed circuitry of FIG. 4. The summing node 12 is connected to the input of a high gain error amplifier 36. The error amplifier 36 generates an inverted error voltage, $V_e$, at its output terminal proportional to the error current $I_e$. The output terminal of the error amplifier transmits this voltage to an input of a phase sensitive emodulator 38. Another input of the demodulator 38 is connected to one of the output terminals of the generator 10. This input terminal receives the voltage $V_r$ from the in phase secondary transformer winding 32. In this manner the demodulator 38 produces a fullwave rectified voltage in phase with a voltage $V_r$ and its output terminal and rejects extraneous quadrature signal components. The output terminal of the demodulator is connected to and feeds a filter 46. The filter 46 further filters and rectifies the ac component of the demodulation voltage and produces a dc voltage $V_{dc}$ proportional to the peak amplitude of the error voltage $V_e$. Thus the error current $I_e$ has been transformed into a dc voltage $V_{dc}$ which is compensated for unwanted resistive and reactive components.

The output of the filter 46 is transmitted to an integrating circuit 54 via a parallel combination of a resistor 48 and a capacitor 50. The resistor capacitor configuration filters the input to the integrator and supplies a driving voltage to a charging capacitor 52 connected between the input and output terminal of a high gain amplifier 56. As is conventional in the art, the integrating circuit connected as such produces an inverted linearly increasing (or decreasing) ramp voltage at its output terminal in response to changes in the input voltage. The rate of change of the ramp voltage is proportional to the value of the input voltage $V_{dc}$. A solid state switching device 62 is additionally connected in parallel with the charging capacitor 56. The switching device 62 closes in response to a clock signal applied to its input and opens in response to the level signal being removed.

The ramp voltage is transmitted to the inverting and noninverting inputs of comparator amplifiers 66 and 68, respectively. The comparator 66 has its noninverting input connected to a source of positive voltage and the comparator 68 has its inverting input connected to a source of negative voltage. The configuration of comparators thus acts as a polarity detector whereby ramp voltage in excess of the positive source will provide a transition at the output of comparator 66 and ramp voltages lower than the negative supply will produce an output transition of the comparator 68.

The outputs of comparators amplifier 66 and 68 are fed to the inputs of NAND gate 80 and NAND gate 82, respectively. NAND gates 80 and 82 are cross coupled at their other inputs to form a RS flip flop whose outputs are connected respectively to the count up, CU, or count down, CD, terminals of the counter 16 through NAND gates 84, 86. The RS flip flop is used to enable either one or the other of the NAND gates 84, 86 depending upon which comparator produces a transition.

The outputs of the comparators 66 and 68 further feed the inputs of a NAND gate 70 which transmits transitions of either comparator to the input of a monostable 72. The monostable is triggered into an unstable state by either of the transitions of the comparators and produces a pulse of predetermined width upon each transition. This output transition is transmitted to the other inputs of NAND gates 84 and 86 to provide clock signals to the CU and CD inputs and further a clock signal to the switching device 62 via NOR gate 74.

In operation the polarity detector responds to the voltage $V_{dc}$ to clock the counter 16 at a rate determined by the amplitude of that voltage. With respect now to FIG. 8 there is shown waveforms that illustrate the operation of the polarity detector 14. For example, if the pressure increases an increment as shown at the transition 120, then the voltage $V_{dc}$ will proportionately decrease to a level 122. Assume now that the capacitor 52 is discharged and that switch 62 is open. The voltage $V_{dc}$ will therefore cause the capacitor to begin charging in a ramp-like fashion at 124 until it exceeds the positive reference voltage of the comparator 66. When this occurs at 126 the output of the comparator 66 transitions to a low level at 128 and the output of NAND gate 180 transitions to a high level at 130. This transition enables the NAND gate 84 and the count up input of the counter 16. Conversely, this transition disables the count down NAND gate 86 by having the output transition to a low level as shown at 132.

The transition of the comparator 66 further triggers the monostable 72 to produce a positive pulse beginning at 136 and ending at 148 five microseconds later. This clock signal is transmitted to the NOR gate 74 causing a closure of the switch 62 and a discharge of a capacitor 52 shown at 142. The clock signal from the monostable 72 is transmitted through the enabled NAND gate 84 to increment the counter 16 to a number, n+1. This number is converted by the loop to decrease the error voltage by increasing the feedback current by one increment. The change in the error current produces a corresponding change in the voltage $V_{dc}$ indicated at 154. The loop continues to operate in this manner as long as the error current is present and thus the voltage $V_{dc}$ is non-zero.

The rate at which the counter is either clocked up or clocked down is dependent upon the ramp rate of the integrating circuit 54. This ramp rate is dependent upon the amplitude of the voltage $V_{dc}$ and hence the magnitude of the error current $I_e$. Larger error currents will cause the loop to increment the counter faster and smaller error currents to decrease the counting rate of the loop. Therefore, the larger the change in pressure or the farther away the system is from settling, the faster the loop will clock the counter. When the counter begins to approach the settlement point, the polarity detector will slow the counting rate and stabilize the loop. This mode of operation in combination with the nonlinear incrementation of the feedback current further provides a more responsive settlement time over the entire pressure range.

In this embodiment it is seen that the feedback loop is similar until the function $-V_r f(n)$ is generated at the output of the amplifier 28. In this Figure it is assumed f(n) is a linear function. The feedback voltage is fed into a pressure sensitive feedback sensing capacitor $C_{fs}$ and inverted by the inverter 102 to feed a substantially invariable feedback reference capacitor $C_{fr}$. As was similarly described for the pressure capsule 24, $C_{fs}$ and $C_{fr}$ can be identical to the quartz capacitive pressure transducer illustrated previously.

It is seen, therefore, that the feedback current $I_f$ will equal $-V_r f(n) (C_{fs}-C_{fr})$. This provides a feedback signal which will incrementally change as the difference of $C_{fs}-C_{fr}$. If the capsule 105 is placed in the same pressure measurement chamber 22 as the capsule 24 the difference in the two pressure sensitive capacitances change in concert with the same pressure. The feedback current, therefore, for incremental increases in the feedback voltage is one that generally increases with pressure. This function is therefore the same as that disclosed in FIG. 2.

Because a quartz capacitive transducer may be made with such specificity, the difference between $C_{fs}$ and $C_{fr}$ may at lower pressures be very close and the incremental value of the current change at these low values extremely small. This is the value that will set the maximum resolution of the system. As $C_{fs}$ changes with increasing pressure the difference will increase and larger increments of feedback current $I_f$ will be delivered for increasing counts of the counter 16. This embodiment is more advantageous from a manufacturing viewpoint since the function is actually tailored as a physical configuration of the feedback capsule 105 and can be precisely duplicated in other capsules. Further complex circuit functions for the amplifier and the MDAC are not necessitated by this mode of operation.

The system will be in a quiescent state only when error current is reduced to zero. This steady state condition is satisfied when $I_p - I_r - I_f = 0$. Since $I_p - I_r$ is proportional to $V_r (C_s - C_r)$ and $I_f$ is proportional to $-V_r$ n/nmax $(C_{fs}-C_{fr})$, it follows that this steady state condition is met when $N = $ nmax $(C_s - C_r / C_{fs} - C_r)$ Since the value of nmax is known, since the capacitance values of $C_r$ and $C_{fr}$ are known and since the values of variable capacitances $C_s$ and $C_{fs}$ are known and since the values of variable capacitances $C_s$ and $C_{fs}$ depend upon the pressure P, it follows that the number n depends upon the pressure P. Thus, the number n, which is the output of digital counter 16, may be utilized as a representation of the pressure P.

The system in FIG. 4 may be calibrated by exposing the transducers 24, 105 to a set of known pressures P and temperatures T. The number n is then recorded for each of these pressures and temperatures and a look-up table of the values of number n, pressure P and temperature T is composed. To measure an unknown pressure, the unknown pressure is introduced into chamber 22 and the resulting number N and temperature representation $V_t$ is recorded. The look-up table may then be used to find the pressure which corresponds to the measured values of n and $V_t$.

An alternate method is to derive, from the calibration data for known pressures and temperatures, an equation for the pressure P as a function of the variables n and T. Then, to obtain an indication of an unknown pressure, this equation may be implemented in software to convert the measured number n and the measured temperature representative $V_t$ to a representation of the unknown pressure.

It is suggested that the general relationship among the capacitors of transducers 24 and 105 be such that $C_s$ and $C_{fs}$ are of substantially equal value and increase similarly over the chosen pressure range. Capacitor $C_r$ should be slightly less than $C_s$ at low pressure and $C_{fr}$ should be slightly less than $C_r$ at low pressure. More particularly, it is suggested that capacitors $C_s$, $C_{fs}$, $C_r$, and $C_{fr}$ be chosen such that the following relationships are satisfied:

0.1 pf > $(C_s - C_r)$ > 0.02 pf at Pmin, 0 pf < $(C_{fs}-C_{fr}) - (C_s - C_r)$ at Pmax < $(C_s - C_r)$ at 5% of Pmax, and $(C_s - C_r)$ at 13% of Pmax < $(C_{fs}-C_{fr})$ at Pmin < $(C_s - C_r)$ at 15% of Pmax, where Pmin and Pmax represent the minimum and maximum pressure, respectively, in the pressure range to be measured.

If these relationships are satisfied, then the system will operate to provide a desired non-linear resolution feature wherein the resolution is a substantially constant percentage of the point pressure, rather than a certain percentage of the full scale or maximum pressure to be measured. In other words, proportionately more of the 4096 data bits are available for resolution at the lower end than at the higher end of the pressure range to be measured. This is a consequence of the above relationship and of the steady state equation:

$$n = \text{nmax} ( (C_s - C_r) / (C_{fs}-C_{fr}) ).$$

For example, for a given pressure change in the lower end of the allowed pressure range, the system will produce a certain corresponding change in the number n. However, at the higher end of the allowed pressure range, a smaller change in the number n will result from the same given absolute pressure change.

While a detailed description of the preferred embodiments have been disclosed, it will be obvious to those skilled in the art that various modifications and changes may be made thereto without departing from the scope and spirit of the invention as hereinafter defined in the appended claims.

What is claimed as an exclusive right is:

1. A capacitance to digital conversion system comprising:
    means for generating first and second alternating reference signals having a predetermined phase relationship therebetween;
    a primary sensing capacitor for measuring a condition driven by one of said reference signals;
    a digital-to-analog converter driven by one of said reference signals for converting a digital signal to a first alternating feedback signal;
    means for generating a second alternating feedback signal having a predetermined phase relationship with the first alternating feedback signal;
    a feedback reference capacitor driven by one of said feedback signals;
    a feedback sensing capacitor sensitive to said condition driven by the other of said feedback signals;
    means, connected to the primary and feedback capacitors, for generating an error signal related to the sensed condition when currents through the primary and feedback capacitors are other than equal and opposite; and
    analog-to-digital converting means for converting said error signal to said digital signal wherein said digital signal is fed back to the digital-to-analog converter for conversion thereby to the first alternating feedback signal and is a measurement of said condition.

2. A digital measuring system comprising:
    means for generating first and second alternating excitation signals out of phase with each other;
    a primary reference capacitor, excited by one of said excitation signals, having a relatively invariable capacitance;

a primary sensing capacitor, excited by the other of said excitation signals, having a capacitance which changes with variances in a sensed parameter;

means for receiving the output of the excited primary capacitors, for generating an error signal related to the sensed parameter;

means for counting at a predetermined rate, said counting means enabled by the presence of said error signal;

a digital-to-analog converter for converting the count from said counter means into a first alternating feedback signal having the same phase as that of the excitation signal of said primary reference capacitor;

means for generating a second alternating feedback signal identical with said first feedback signal except out of phase therewith;

a feedback reference capacitor, excited by said second feedback signal, having a relatively invariable capacitance;

a feedback condition sensing capacitor, excited by said first feedback signal, having a capacitance which changes with variances in said sensed parameter; and means for summing the outputs of said feedback capacitors with the outputs of said primary capacitors to null said error signal.

3. A capacitance to digital conversion system comprising:

means for generating first and second alternating reference signals having a predetermined phase relationship therebetween;

a primary reference capacitor driven by one of said reference signals;

a primary sensing capacitor for measuring a condition driven by the other of said reference signals;

a digital-to-analog converter driven by one of said reference signals for converting a digital signal to a first alternating feedback signal;

means for generating a second alternating feedback signal having a predetermined phase relationship with the first alternating feedback signal;

a feedback reference capacitor driven by one of said feedback signals;

a feedback sensing capacitor for measuring said condition driven by the other of said feedback signals;

means, connected to the primary and feedback capacitors, for generating an error signal related to the sensed conditions when currents through said primary and feedback capacitors are other than equal and opposite, said error signal generating means including means for summing the currents of said primary and feedback capacitors and means for amplifying said error signal; and analog-to-digital converting means for converting said error signal to said digital signal wherein said digital signal is fed back to said digital-to-analog converter for conversion thereby to said first alternating feedback signal and is a measurement of said condition, said analog-to-digital converting means including means for generating a ramp signal having a rate of change proportional to the magnitude of said error signal, first comparator means for generating at an output thereof a count up signal when the value of the ramp signal is greater than an upper bound, second comparator means generating at an output thereof a count down signal when the value of the ramp signal is less than a lower bound, a digital counter with a count up input and with a count down input, and logic means connected to the comparators and connected to the count up and count down inputs of the counter for increasing the contents of the counter in response to a count up signal and for decreasing the contents of the counter in response to a count down signal.

4. The system of claim 3, wherein the logic means comprises:

a monostable multivibrator with an input and an output;

a first gate with an output connected to the input of the multivibrator and with inputs connected to the outputs of said comparator means for triggering the monostable multivibrator when the outputs of the comparator means change states;

a second gate, with an output, having one input connected to the output of one of the comparator means and having another input;

a third gate, with an output, having an input connected to the output of the other comparator means and having another input, the other input of the third gate being connected to the output of the second gate and the other input of the second gate being connected to the output of the third gate;

a fourth gate with an output connected to the count up input, with one input connected to the output of the multivibrator and with another input connected to the output of the second gate;

a fifth gate with an output connected to the count down input, with one input connected to the output of the multivibrator and with another input connected to the output of the third gate.

5. The system of claim 3, wherein said analog-to-digital converting means further comprises:

switch means, connected in parallel with said ramp generating means, for nulling said ramp signal; and control means responsive to said count up and down signals and connected to said switch means for closing said switch means when the count up and down signals change states.

6. The system of claim 4, wherein said analog-to-digital converting means further comprises:

controlled switch means with a control input and connected in parallel with said integrating means for closing to null said ramp signal in response to a control signal applied to the control input thereof; and a sixth gate with an output connected to the control input of the controlled switch means, with one input connected to the output of the first gate and with an other input connected to the output of the multivibrator, said sixth gate generating said control signal when the comparators and the multivibrator are in selected states.

7. The system of claim 3, wherein the digital-to-analog converter comprises:

a ratiometric attenuator with an output terminal, with a reference input coupled to receive one of the alternating reference signals, and with inputs coupled to outputs of said digital counter, the attenuator generating at its output terminal an attenuated reference signal, the attenuation of which is proportional to the output of the analog-to-digital converting means, the attenuated reference signal comprising said first alternating feedback signal.

8. The circuit of claim 3, wherein:

said primary sensing and reference capacitors are disposed within a transducer of the capacitive type, said transducer comprising a hollow body having spaced opposing walls of insulating material supported at their edges, the portions of the walls spaced from the edges being deflectable relative to one another in response to changes in pressure and the portions of the walls adjacent the edges being substantially nondeflectable relative to one another with changes in pressure, electrical conducting means on opposing surfaces of the deflectable portions of said walls forming plates of said primary condition sensing capacitor, and electrical conducting means on opposing surfaces of the substantially nondeflectable portions of said walls forming plates of said primary reference capacitor.

9. The system of claim 8, wherein:

said feedback sensing and reference capacitors are disposed within a further transducer of the capacitive type, said transducer comprising a hollow body having spaced opposing walls of insulating material supported at their edges, the portions of the walls spaced from the edges being deflectable relative to one another in response to changes in pressure and the portions of the walls adjacent the edges being substantially nondeflectable relative to one another with changes in pressure, electrical conducting means on opposing surfaces of the deflectable portions of said walls forming plates of said feedback condition sensing capacitor, and electrical conducting means on opposing surfaces of the substantially nondeflectable portions of said walls forming plates of said feedback reference capacitor.

10. The system of claim 3, wherein:

the values of the primary and feedback sensing capacitors are substantially equal and vary in a like manner in response to changes in said condition;

the value of the primary reference capacitor is slightly less than the value of the primary sensing capacitor at a lower limit of said condition; and the value of the feedback reference capacitor is slightly less than the value of the primary reference capacitor at the lower limit of said condition.

11. The system of claim 3, wherein:

the digital signal produced by the analog-to-digital converting means during substantially steady-state conditions is proportional to:

$$\frac{(C_s - C_r)}{(C_{fs} - C_{fr})} \times (N\text{max})$$

where $C_s$ is the primary sensing capacitor, $C_r$ is the primary reference capacitor; $C_{fs}$ is the feedback sensing capacitor $C_{fr}$ is the feedback reference capacitor, and Nmax is the maximum digital number which can be processed by the digital-to-analog converter.

12. A system for measuring a variable parameter comprising:

means for generating a measurement signal indicative of the value of an electrical characteristic of a sensing element whose value varies with changes in the measured parameter;

means for generating an incrementally varying feedback signal wherein all increments of the feedback signal are not equal and the feedback signal has an opposite polarity to said measurement signal;

means for generating an error signal which is the sum of said measurement signal and said feedback signal, wherein said feedback signal generating means varies said feedback signal in response to the error signal to null said error signal;

means for counting the number of increments of said feedback signal necessary to null said error signal; and means for generating an output signal which is dependent upon the count of said counting means and is representative of said measured parameter.

13. A system as defined in claim 12 wherein said sensing element is a capacitor having a capacitance value which changes with variances in the measured parameter.

14. A system as defined in claim 13 wherein said feedback signal generating means includes:

said means for counting;

a digital-to-analog converter for converting the count of said counting means into an analog signal; and a feedback capacitance fed by the analog signal and connected to said error signal generating means for transmitting said feedback signal to said error signal generating means.

15. A system as defined in claim 14 wherein said counting means counts in unequal increments for variances in the error signal.

16. A system as defined in claim 14 wherein said digital-to-analog converter converts the incremental count from said counting means into unequal increments of said analog signal.

17. A system as defined in claim 14 wherein said feedback capacitance varies in unequal increments for incremental changes in said analog signal.

18. A system as defined in claim 17 wherein said feedback capacitance varies proportionately with said measured parameter.

19. A system as defined in claim 18 wherein said feedback capacitance comprises:

a feedback reference capacitor having a relatively invariable capacitance;

a feedback sensing capacitor having a capacitance which changes with variances in said parameter;

said feedback capacitors being connected such that the feedback signal is dependent upon the value of said analog signal and the difference in values between said feedback sensing capacitor and said feedback reference capacitor.

20. A system as defined in claim 19 wherein the measured parameter is pressure.

21. A system as defined in claim 20 wherein said reference element and said sensing element are both contained in a single quartz capacitive transducer capsule.

22. A system as defined in claim 21 wherein said feedback reference capacitor and said feedback sensing capacitor are both contained in a single quartz capacitive transducer capsule.

23. A system for measuring a variable parameter as defined in claim 12 wherein said output signal generating means includes:

means for storing an array of known values of said parameter corresponding to known values of said count; and means for interrogating said storing means with a count values corresponding to an unknown value of said parameter, said storing means generating said output signal in response to said interrogation as the stored value of the parameter corresponding to said unknown count value.

24. A system for measuring a variable parameter as defined in claim 23 further including:

means for generating a temperature value indicative of the ambient temperature at which the system is measuring the parameter;

wherein said storing means further includes means for storing an array of known values of said parameter corresponding to known values of said count at known values of temperature;

wherein said interrogating means further includes means for interrogating said storing means with count values corresponding to an unknown value of said parameter and said temperature value;

said storing means generating said output signal in response to said interrogation as the stored value of the parameter corresponding to said unknown count value at said temperature value.

25. A system for measuring a variable parameter as defined in claim 12 which further includes:

means for varying the counting rate of said counting means as a function of the magnitude of the error signal.

26. A system for measuring a variable parameter as defined in claim 25, wherein:

said counting rate is increased for increasing error signals and is decreased for decreasing error signals.

27. A method of measuring a pressure comprising the steps of:

generating an error signal indicative of the difference between a measurement signal whose value changes with pressure and a feedback signal;

nulling said error signal with said feedback signal by incrementally varying said feedback signal until it equals said measurement signal wherein all increments of the feedback signal are not equal;

counting the number of increments of the feedback signal necessary to null said error signal; and generating an output signal representative of said count and said pressure.

28. A method of measuring a pressure as defined in claim 27, wherein the steps of nulling said error signal further includes:

varying the rate of incrementing the feedback signal according to the magnitude of the error signal.

29. A method of measuring a pressure as defined in claim 27 further including the step of:

calibrating said output signal by storing an array of known values of pressure corresponding to known count values and measuring an unknown pressure by selecting a known pressure value as the output signal corresponding to a count value when the error signal is nulled.

30. A method of measuring a pressure as defined in claim 29, wherein the step of calibrating the output signal further includes the steps of:

storing an array of known values of pressure corresponding to known values of said count at known values of temperature;

reading the value of the ambient temperature at which the measurement of the unknown pressure is being made; and selecting a pressure value from said array corresponding to said count value and said temperature value of said unknown pressure.

* * * * *